July 18, 1939.　　　R. E. KELLER　　　2,166,357
AUTOMATIC TRANSMISSION CLUTCH
Filed March 2, 1934　　　2 Sheets-Sheet 1
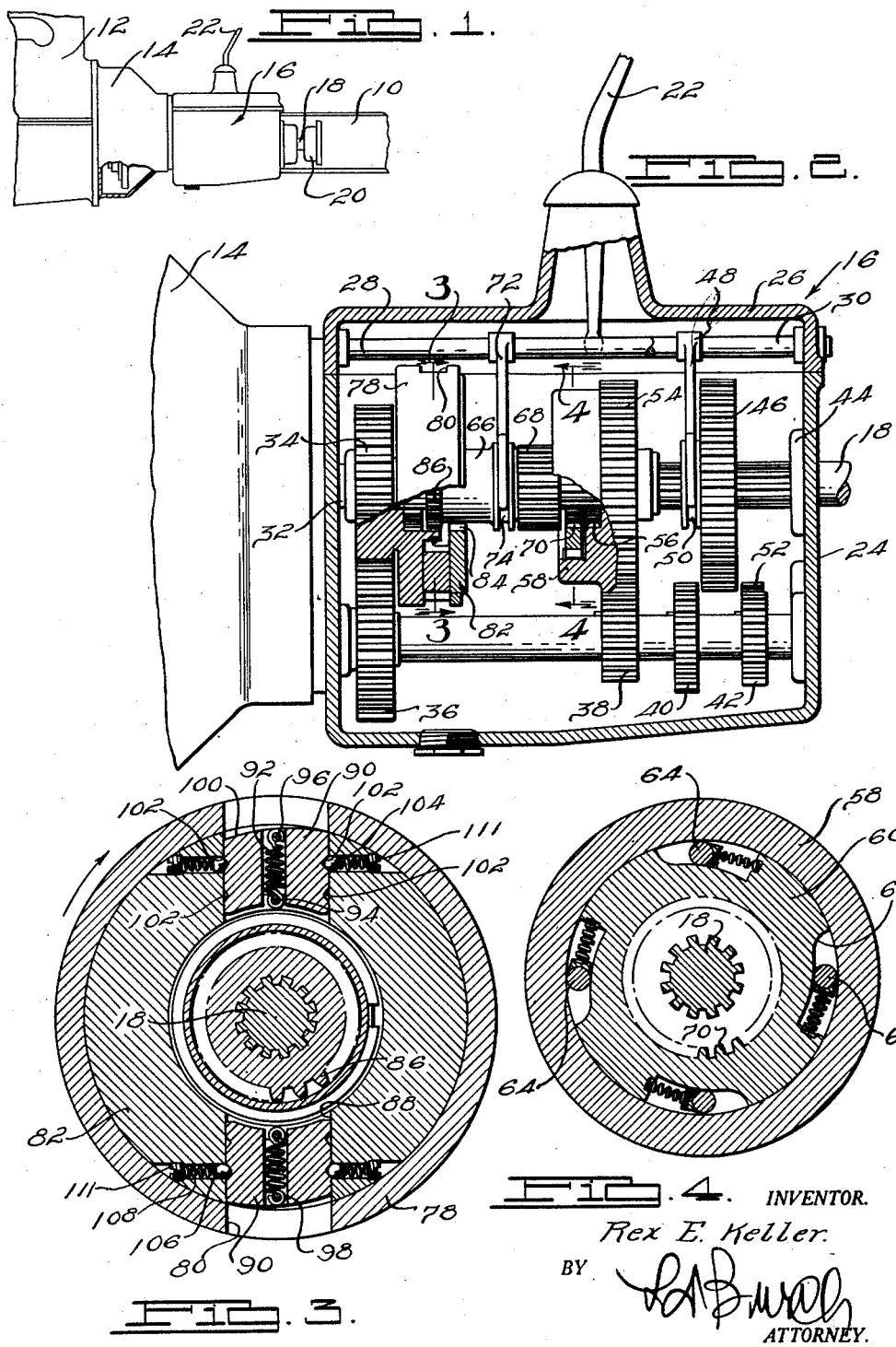
INVENTOR.
Rex E. Keller.
BY
ATTORNEY.

July 18, 1939. R. E. KELLER 2,166,357
AUTOMATIC TRANSMISSION CLUTCH
Filed March 2, 1934 2 Sheets-Sheet 2
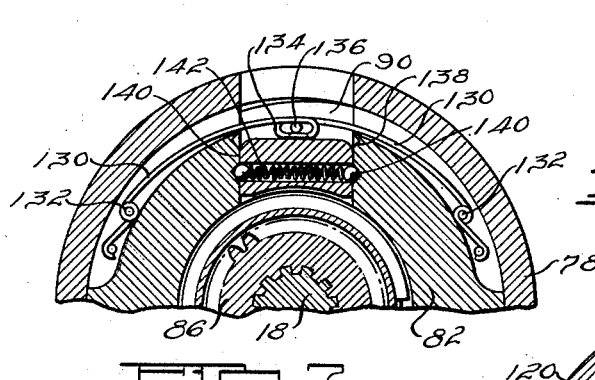
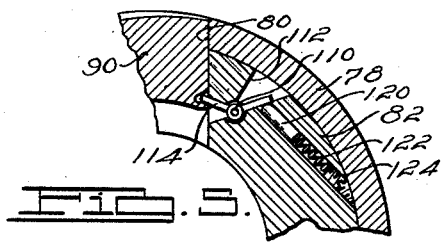
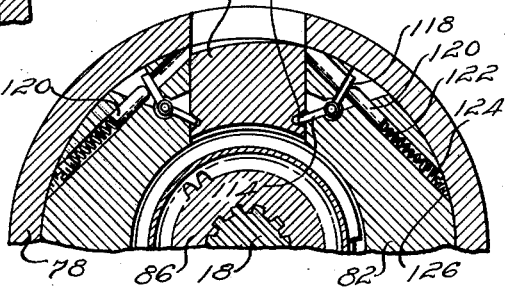
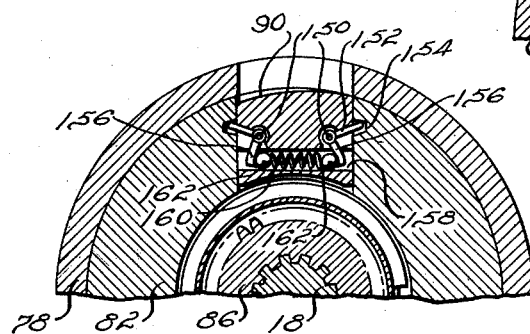
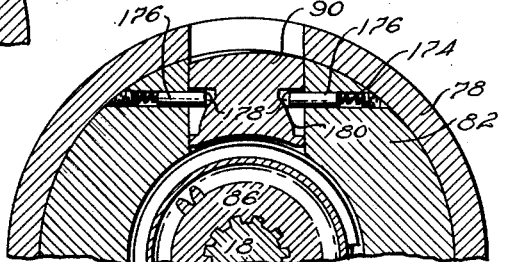
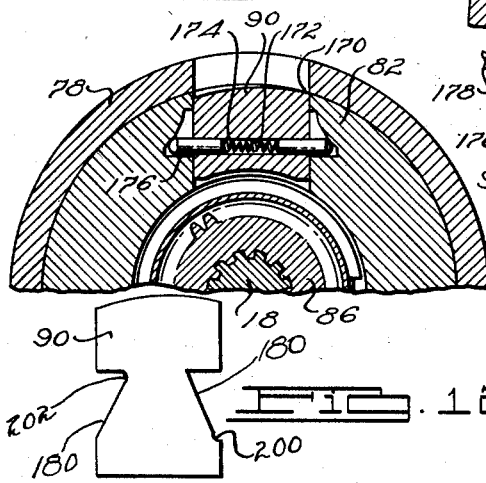
INVENTOR.
Rex E. Keller.
BY
ATTORNEY.

Patented July 18, 1939

2,166,357

UNITED STATES PATENT OFFICE 2,166,357

AUTOMATIC TRANSMISSION CLUTCH

Rex E. Keller, Beverly Hills, Calif.

Application March 2, 1934, Serial No. 713,634

25 Claims. (Cl. 192—105)

This invention relates to transmissions of the automatic type and particularly to improvements in automatic clutches adapted for use in transmissions for changing the speed ratio responsive to certain factors or conditions of operation of the vehicle in which such a device may be incorporated. The present invention is similar and related to mechanisms which form the subject matter of my applications for patents and United States Letters Patent identified as follows:

1. Application for patent for Automatic transmission, Serial Number 715,513, filed March 14, 1934;
2. Application for patent for Automatic transmission, Serial Number 686,683, filed August 25, 1933;
3. Application for patent for Clutch, Serial Number 529,666, filed April 13, 1931;
4. United States Letter Patent 1,969,561, issued August 7, 1934, and
5. United States Letters Patent 2,003,634, issued June 4, 1935.

Automatic speed changing mechanisms of the positive locking type, such as that form disclosed in the accompanying drawings, include two clutch members, one of which is provided with a bolt operable under certain conditions to engage the other clutch member positively for connecting the two clutch members to provide a driving connection through the same and between the shaft to which the same may in practice be connected. These clutch members may be used in combination with change speed gearing of different types and arrangements for effecting automatic changes in the ratio of the driving connection between a driving and driven shaft. In the form selected for the purposes of illustrating the invention, a clutch drum is affixed to a driving shaft, and a clutch core is adapted to be operatively connected to a driven shaft, an overrunning clutch is disposed in a driving connection between the shafts supported by a countershaft train of gears, and the clutch core connected to the driven shaft is provided with a radially movable bolt pawl or dog which is operable responsive to centrifugal force for positive locking engagement with the clutch drum to provide a direct connection between the driving and driven shafts, and the overrunning clutch is adapted to permit overrunning of the gear train when the direct driving connection between the driving and driven shafts is provided.

For controlling the operation of the bolts, pawls or dogs as they may be termed, I provide a detent, restraining or latching means which is adjustable through a slot in the drum or outer member by moving an abutment in the direction of or away from the bolt so as to vary the forces acting on the bolt in opposition to centrifugal force, a coil spring being interposed between the abutment and the element of the detent which engages the bolt, or pawl. If desired the detent may include a single unit operative to latch the bolt in clutched and declutched positions.

An object of the invention, therefore, is to provide an automatic clutch for cancelling speed changing mechanism with which the clutch is operative to provide or effect an increase in the ratio of the driving connection between two shafts at a higher rate of speed than that at which the device is operative to effect a change to a lower speed ratio.

Another object of the invention is to improve the operating characteristics of and automatic clutch mechanisms of this type.

Another object of the invention is to provide a mechanism of this character which is simple in design, inexpensive to manufacture, and which may be readily assembled or disassembled for repair and/or adjusting the same to effect the operation thereof under different conditions of operation.

Other objects and advantages will be apparent from the following specification, taken in conjunction with the accompanying drawings of which there are two sheets and in which:

Fig. 1 is a diagrammatic view of a portion of an automotive vehicle showing the location of the transmission mechanism and clutch embodying my invention;

Fig. 2 is a longitudinal vertical sectional view of a clutch and transmission mechanism embracing my invention;

Figs. 3 and 4 are vertical cross sectional views of parts of the mechanism illustrated in Fig. 2 and taken in planes on the lines 3—3 and 4—4, respectively, thereof;

Figs. 5 to 10, inclusive, are views corresponding with Fig. 3 and illustrating several modifications of the invention;

Fig. 11 is an enlarged view, partly in section, of certain portions of the parts disclosed in Figs. 9 and 10; and Fig. 12 is an enlarged side elevational view of a modified form of bolt construction.

In Fig. 1 of the drawings there is diagrammatically illustrated a portion of an automotive vehicle having a main frame 10 providing a support for an engine 12, a housing-enclosed clutch mechanism 14 and a transmission 16, from the rear end of which a shaft 18 extends, which, in practice, is operatively connected to the road wheels of the vehicle through a suitable universal joint mechanism 20. The transmission mechanism 16 is provided with a shift lever 22 whereby selective changes in the driving connection between the engine shaft and the driven shaft 18 may be manually effected.

The transmission mechanism 16, in general, comprises a case 24 affording a housing for the operating parts of the transmission, a cover plate 26 for closing the case 24 and providing a support for axially movable shifter rods 28 and 30, which are adapted to be operated by the manual shift lever 22 for the purpose of selectively controlling the operation of the transmission mechanism. A shaft 32 adapted to be connected to the engine 12 through the housing-enclosed clutch mechanism 14 is provided on that portion which extends within the case 24 with a gear 34 fixed to rotate therewith and which meshes with a gear 36 of a countershaft gear cluster including gears 38, 40 and 42, for the purpose of rotating the same. The driven shaft 18 at its forward end is journaled in a bearing (not shown) provided in the counterbored end of the driving shaft 32 and in a bearing 44 carried by the case 24.

When the parts are in the position illustrated in Fig. 2, there is no operative driving connection between the driving shaft 32 and the driven shaft 18. A gear 46 is slidably splined to the driven shaft 18 and is adapted to be moved to the left, looking at Fig. 2, to mate with gear 40 of the countershaft for the purpose of providing a two-way driving connection between the shafts through the intermediary of gears 34, 36, 40 and 46. The two-way driving connection may be effected by an operator of the vehicle by manipulation of the shift lever 22 to slide shifter rod 30, which is provided with a fork 48 running in a groove 50 provided on a head portion of the gear 46. If the vehicle is at rest at such time as it is desired to effect a driving connection between the shafts 32 and 18 through the gears 46 and 40, the housing-enclosed clutch mechanism 14 must be released so that the gear 46, which at such time would be stationary, may be shifted axially to mate with gear 40, which otherwise would be rotating. The driving connection between the shafts 18 and 32, effected as a result of shifting gear 46 to mate with gear 40, may be utilized for initiating the rotation of the driving shaft 18 and a consequent movement of the vehicle in a forward direction. Gear 46 is adapted to be shifted to the right, looking at Fig. 2, to mate with an idler gear 52, which mates with countershaft gear 42 and rotates in a reverse direction therefrom, for the purpose of providing a reverse driving connection between the shafts 32 and 18 for effecting a rearward movement of the vehicle.

A gear or toothed member 54, freely mounted on the driven shaft 18 but fixed against axial displacement, mates with gear 38 of the countershaft gear cluster and is internally provided with a set of teeth 56 and with a cylindrical extension 58. The extension 58 affords the driving member of an overrunning clutch including a driven member 60, in the surface of which a series of annularly spaced eccentric grooves 62 are provided and in each of which there is disposed a spring-pressed wedging roller 64 which is adapted to be wedged between the oppositely disposed surfaces of the driven member 60 and the driving member 58 when there is relative rotation in one direction between the clutch members 58 and 60. A sleeve 66, slidably splined to the driven shaft 18 and disposed between the gears 34 and 54, is provided at one end with an external set of teeth 68 which are adapted to mate with an internal set of teeth 70 provided on the driven member 60 of the overrunning clutch for the purpose of operatively connecting the driven shaft 18 with the driving shaft 32 through the intermediary of the rollers 64, driving clutch member 58 and gears 54, 38, 36 and 34, so that the driven shaft 18 will be driven by the driving shaft 32, but may overrun the same when the rotative speed of the driven shaft is increased relative to that of the driving shaft such as when the throttle controlling the engine speed is cut. A yoke 72, affixed to shifter rod 28, runs in a groove 74 provided on the sleeve 66 and affords a means whereby the manual shift lever 22 may be operated to selectively effect changes in the driving connection between the shafts 32 and 18. Movement of the sleeve 66 to the right to mate teeth 68 with teeth 70 of the driven member 60 of the overrunning clutch will, as described, provide a one-way driving connection between the driving and the driven shafts whereby the forward movement of the vehicle may be initiated.

The sleeve 66 is adapted to be shifted further to the right to mate teeth 68 with teeth 56 of the gear 54 to provide a two-way driving connection between the driving and the driven shafts whereby the overrunning clutch will be eliminated from the driving connection and the shaft 18 at all times will rotate with a fixed ratio with respect to the driving shaft 32.

The gear 34, affixed to the driving shaft 32, is provided with a drum or shell 78 in the surface of which a pair of slotted openings 80 are provided. Nested within the drum or shell 78 there is disposed a core 82 rotatable with respect to the drum 78 and provided with a set of teeth 84 which are adapted to be mated with a set of teeth 86 provided on the sleeve 66 when the same is shifted to the right, looking at Fig. 2, to mate teeth 68 with teeth 70 of the driven member 60 of the overrunning clutch so that the core 82 will rotate with the driven shaft 18 and initially at a speed lower than that of the shell or drum 78. The core 82 may be provided with a plurality of radially extending grooves 88, in each of which there is disposed a slidable bolt pawl or dog 90 which is movable radially outwardly under the influence of centrifugal force resulting from rotation of the core 82 and which is adapted to be retracted from its outward position by a spring 92, one end of which is affixed to a pin 94 carried by the core 82 and the other end of which is affixed to a pin 96 carried by the bolt 90. The bolt 90 may be provided with a longitudinal bore 98 in which the spring 92 may be disposed, if desired. The circumferential face of the bolt 90 is tapered, as indicated at 100, so that when relative rotation between the core 82 and the drum 78 in the direction indicated by the arrow in Fig. 3 exists, the bolt 90 will jump the slots 80 provided in the drum 78 and will continue to do so until the rotative speeds of the members 78 and 82 are substantially synchronous. This action takes place because the length of the slotted opening 80 is only approximately several thousandths of an inch greater than the corresponding dimension of the bolts 90, so that when relative rotation in the direction indicated by the arrow in Fig. 3 exists between the core 82 and the drum 78, the bolts 90 are not in alignment with the slotted openings 80 for a sufficient length of time for the bolts 90 to travel radially the distance between the low and the high side of the bolts 90 which is provided as a result of tapering the circumferential surface of the bolt 90.

When bolts 90 have been projected into the slotted openings 80, which will occur upon approximate synchronization of the rotative speeds of the members 78 and 82 subsequent to the attainment of a predetermined speed of rotation by the core 82, the core 82 will be locked to the drum 78 for rotation therewith. The strength of the spring 92 is one factor which determines the rate of rotation of the core 82 necessary to effect radial outward movement of the bolt 90 under the influence of centrifugal force. Thus, whenever the necessary or predetermined rate of rotation of the core 82 is attained, the bolts 90 will tend to move outwardly, but will be prevented from so doing until the rotative speed of the drum 78 is brought to a substantially synchronous speed. When the bolts 90 have been projected into the slotted openings 80 in the drum 78, they will remain in that position until the centrifugal force resulting from rotation of the core 82 is insufficient to hold them in such position against the tension of the spring 92 when, if torque between the members 78 and 82 is released, the spring 92 will move the bolt to its inward or retracted position for the purpose of disconnecting the members 78 and 82 after which relative rotation between the same may take place.

For the purpose of improving the action of the bolt 90 in moving from one of its positions to the other, each of the bolts 90 may be provided with one or more notches 102, which are adapted to be engaged by spring-pressed poppets 104, carried by the core 82. The spring-pressed poppets 104 form detent latch means and comprise a ball or detent 106 engageable with a notch 102, a spring 108 for backing said ball, and an adjustable plug or abutment 111 threadedly secured in an opening in the core 82 and adjustable exteriorly of drum 78 through a slot 80 for varying the force with which the spring 108 bears against the ball 106. When the bolts 90 are in the position illustrated in Fig. 3, the poppets 104 are in engagement with notches in the bolts 90 and will tend to resist radial outward movement of the bolts 90 under the action of centrifugal force so that before the bolt 90 may move outwardly, the centrifugal force resulting from rotation of the core 82 must be sufficient to overcome the spring 92 as well as the force with which the poppets 104 bear in the notches 102. Once the bolt is moved to disengage the poppets 104 from the notches 102, the centrifugal force of the bolt 90 will be so much greater than the tension of the spring 92 that the bolt will be snapped quickly to its outward position. Similarly, when the bolt is in its outward position, the poppets 104 will engage in notches 102 and tend to resist inward movement of the bolt 90 so that before the spring 92 may move the bolt inwardly, the tension exerted by the spring 92 must be greater than the centrifugal force of the bolt 90 and the force with which the poppets 104 bear against the notches 102. The poppets 104 and notches 102 thus provide a means whereby the bolt 90 will be moved outwardly at a certain predetermined speed and will be moved inwardly at a substantially lower rate of rotation of the core 82. In other words, the bolts 90 may be adjusted so that they will tend to fly out at a certain predetermined speed of rotation of the core, and they will tend to be retracted at a certain predetermined speed of rotation of the core 82 which may be greatly less than the speed of the core 82 at which the bolts move outwardly.

The shifter rod 28, which carries the yoke or fork 72, may be shifted by means of the manual lever 22 for the purpose of shifting sleeve 66 to mate the teeth 68 thereof with teeth 70 of the driven element 60 of the overrunning or free wheeling clutch, at which time the teeth 86 on the opposite end of the sleeve 66 will be mated with the teeth 84 carried by the core 82. When the shaft 32 is driven by the engine, the gear 34 and clutch shell 78 will be driven at engine speed, while the sleeve 66, which is slidably splined to the driven shaft 18, and the core 82 will rotate at a lower rate of speed, depending upon the gear reduction obtained through the countershaft cluster of gears. Thus the clutch shell 78 will overrun the clutch core 82 in the direction indicated by the arrow in Fig. 3, and while the bolts 90 will tend to fly outwardly responsive to centrifugal force after the speed of the core 82 attains a predetermined rate, the beveled surface 100 on the bolts 90 will prevent the same from moving into the slots 80 so long as the clutch drum 78 overruns the core 82 by a substantial difference in the rotative speeds. When, however, the rotative speed of the clutch drum 78 is reduced, relative to that of the core 82 such as by a momentary closing of the throttle governing the speed of the engine, the overrunning clutch connecting the sleeve 66 to the gear 54 will permit the core 82 to rotate at substantially the same rate of speed and without being affected by the slowing down of the engine, so that the rotative speed of the clutch drum will, in decelerating, attain a rate which is substantially synchronous with that of the core 82, at which time the slotted openings 80 will line up with the bolts 90 for a sufficient length of time to permit the bolts 90 to be projected into the slotted openings to lock the core 82 to the clutch drum 78 when the driven shaft 18 will be connected directly to the driving shaft 32 to rotate in unison therewith and at a higher rate than that provided through the countershaft cluster of gears. The bolts 90 will continue to lock the clutch core 82 to the clutch drum 78 until centrifugal force is insufficient to hold the bolts 90 in their outer position when at such time if the torque between the clutch core 82 and the clutch drum 78 is released, the spring 92 will move the bolts back to their inner position, whereupon the gear 54 and the overrunning clutch associated therewith will become operable for driving the driven shaft 18 at a reduced ratio.

In Figs. 5 to 11, inclusive, there are disclosed several modifications of constructions and arrangements for springs for returning the bolt 90 to its retracted position and for controlling the action of the bolts 90 under the influence of centrifugal force.

In the modification disclosed in Figs. 5 and 6, a bell crank lever 110 is pivotally carried by the core 82 within a suitable recess 112 and is provided with an arm 114 engageable with a notch 116 provided in the side of the bolt 90 and with a second arm 118 against one face of which a spring-pressed plunger 120 bears. The spring-pressed plunger 120 is slidably disposed in a suitable bore and is backed by a spring 122, the tension of which may be adjusted by a plug 124 threadedly secured within the bore 126. In this instance, the bolts 90 need not be provided with a separate spring for retracting the same, as a bell crank lever such as 110, disposed one on each side of the bolts, as shown in Fig. 6, will resist the radial outward movement of the bolts 90, responsive to centrifugal force, and retract the bolts 90 when the centrifugal force is insufficient to hold the bolts in their projected position as well as to limit the travel of the bolt 90 in both directions, since the side walls of the recesses will be engaged by the arms of the bell crank to limit the pivoting thereof about its axis.

In Fig. 7 of the drawings there is shown a modification in which the spring-pressed poppets are carried by the movable bolt 90 instead of by the core, and in this embodiment a hair spring 130 is secured to the core 82 by pins 132. One end of the spring 130 is provided with a hook-shaped portion 134, which cooperates with a pin 135 carried by the bolt 90 for limiting the outward movement of the same and for moving the same to its inward position against the action of centrifugal force. As is shown in Fig. 7, the core is provided with two hair springs 130, one disposed on each side of the bolt 90 and within a peripheral groove in the core 82. The core 82 is provided with a pair of spaced notches 138 on each side of the groove in which the bolt 90 is slidable and which notches are adapted to be engaged by spring-pressed poppets 140 disposed within a bore 142 provided within the bolt 90. The action of the spring-pressed poppets 140 is exactly the same as that of the poppets 104, as shown in Fig. 3, the only difference being that in the embodiment disclosed in Fig. 7 these poppets are carried within a bore in the bolt 90 and the notches are provided in the core member 82.

In Fig. 8 there is disclosed an embodiment of the invention which corresponds with the embodiment disclosed in Fig. 6 and differs therefrom in the fact that the bell crank levers 150 are carried by the bolt 90 and are provided with an arm 152, the end of which is in engagement with a notch 154 provided in the core 82. Between each of the arms 156 of the bell crank 150 and within a transverse bore 158 provided within the bolt 90, a spring 160 is disposed which is confined between balls 162 and bears against the lever arm 156 for holding the bolt 90 inwardly. Movement of the bolt 90 outwardly under the action of centrifugal force will pivot the arms of the bell crank about their pivot and compress the spring 160 which, when the centrifugal force of the bolt 90 falls below the effective force of the spring 160 tending to move the bolt 90 inwardly, will return the bolt to its inward position.

In Figs. 9 to 11, inclusive, there is shown one embodiment of the invention in which the movement of the bolt is controlled by one or more spring-pressed poppets acting on a tapered or cam surface. In Fig. 9 the bolt 90 is provided with a set of oppositely acting poppets 170 disposed within a bore 172 provided within the bolt and forced apart by a spring 174 located within said bore and between said poppets. The poppets comprise a shell 176 having one end telescopically engageable with the spring 174 and the other end of which provides a cage for a roller 178 which is adapted to roll upon a tapered or cam surface 180. The cam surface 180 may be cut into the core 82, as in Fig. 9, or in the bolts 90, as in Fig. 10, and is gradually tapered so that when the bolt 90 is in its retracted position, the roller 178 will lie in the deepest part of the groove provided by the cutting of the cam surface 180 and will afford a substantial resistance to the outward movement of the bolt 90 under the action of centrifugal force. That portion of the tapered surface 180 with which the roller 178 is shown in contact in Fig. 11, has a deeper pitch than the remaining portion of the surface, so that a relatively great amount of centrifugal force is required to move the bolt 90 outwardly since the spring 174 at such time will have to be compressed. As soon as the bolt 90 has started to move outwardly, the pitch of the surface 180 decreases so that the effective force of the spring 170, resisting the radial outward movement of the bolt, decreases, with the result that the bolt once it begins to travel will quickly complete its movement from an inward position to an outward position. The high point in the groove provided by the cam surface 180 has a relatively small amount of pitch, so that when the bolt is in its outward position and the roller 178 is in contact with the surface at the shallower end of the groove, only a small amount of centrifugal force will be required to hold the bolt in its outward position since the effective force of the spring 174 acting on the tapered surface 180 will be very small at that point. However, as soon as the bolts start to travel inwardly, the pitch of the surface 180 increases, so that the effective force of the spring 174 on the tapered surface 180 increases, with the result that greater force will be applied to move the bolt to its inward position. As is shown in Figs. 9, 10 and 11, this construction is applied to the clutch either by mounting the spring-pressed poppets in the bolt and cutting the tapered surface in the adjacent sides of the core 82 or, as shown in Fig. 11, the spring-pressed poppets may be carried by the core 82 and the tapered surface may be cut in the sides of the bolt 90. It will be noted, however, that the tapered surface provided on the bolt 90, as shown in Fig. 10, is just the opposite of the tapered surface cut on the core 82, as shown in Fig. 9.

As the bolt 90 is movable responsive to centrifugal force, when the core 82 attains a predetermined speed of rotation, the bolt 90 will at such time start to move radially outwardly or inwardly, depending upon whether the bolt at such time is in its outer or inner position, for the purpose of connecting or disconnecting the core 82 with the drum 78. On account of the tapered surface 100 provided on the bolt 90, the same will jump the slots 80 in the clutch drum 78 until the rotative speeds of the drum and core are substantially synchronous. When approximate synchronization of the rotative speeds of the clutch drum 78 and core 82 are brought about, the bolt 90 will move to extend into the slotted opening 80 in the clutch drum 78. In order that the bolt 90 may be moved from one of its positions to the other quickly, it is essential that the forces applied to move the bolt be much greater than the forces resisting movement of the bolt in order that the bolt 90 will not be caught in a midway position where the same might be sheared off.

In Fig. 12 there is disclosed a modified form of bolt 90 in which a notch 200 may be provided at one end of the tapered surfaces 180 for delaying the initial inward movement of the bolt 90 under the influence of the force of the spring-pressed poppet 174 bearing against the tapered surface provided on the other side of the bolt 90, and a notch 202 may be provided at the opposite end of the opposite tapered surface 180 for delaying the initial outward movement of the bolt 90 under the action of centrifugal force.

All of the various arrangements of spring constructions herein disclosed for retracting the bolt from engagement with the clutch drum 78 and for causing an accumulation of the forces tending to move the bolt from one of its positions to the other, provide an effective and extremely practical method of controlling the operation of the bolt 90.

While several modifications of the invention are disclosed in the drawings showing various arrangements of springs and poppets for controlling the operation of the bolt 90, it will be appreciated that many other modifications and designs of spring constructions may be made for controlling or regulating the operation of the bolt 90, and for that reason I do not desire to be limited to any particular form or arrangement except as defined by the following claims:

I claim:

1. In a device of the class described, a rotatable clutch member provided with a bolt-receiving recess, a second rotatable clutch member operatively associated with said first mentioned clutch member and provided with a movable bolt adapted to engage in said recess for positively locking said clutch members together, said bolt being movable in one direction responsive to centrifugal force resulting from rotation of said second clutch member and being adapted to cooperate with the first named clutch member for preventing the movement of said bolt under the influence of centrifugal force until the rotative speeds of said clutch members are substantially synchronous, and spring means acting on said bolt to oppose movement of the same under the influence of centrifugal force and adapted to return said bolt to its normal position at a lower speed of rotation of the second mentioned clutch member than that at which said bolt tends to move under the action of centrifugal force to provide a difference between the speeds of said second clutch member at which said bolt is moved from one of its positions to the other, said spring means including springs, and independently operable tension adjusting means therefor.

2. In a device of the class described, a rotatable clutch member provided with a bolt-receiving recess, a second rotatable clutch member operatively associated with said first mentioned clutch member and provided with a bolt movable under the influence of centrifugal force resulting from the rotation of said second clutch member at a predetermined rate to engage in said recess for positively locking said clutch members together and being adapted to cooperate with the first named clutch member for preventing the movement of said bolt into said recess until the rotative speeds of said clutch members are substantially synchronous, and spring means acting on said bolt to oppose the movement of the same under the influence of centrifugal force and adapted to move said bolt out of said recess at a lower speed of rotation of said second clutch member to provide a difference between the speeds of said second clutch member at which said bolt is movable to lock and unlock said clutch members, said spring means including separate springs resisting movement of the bolt, and means for varying the tension of said springs.

3. In a device of the class described, a rotatable clutch member provided with a bolt-receiving recess, a second rotatable clutch member operatively associated with said first mentioned clutch member and provided with a bolt movable under the influence of centrifugal force resulting from the rotation of said second clutch member to engage in said recess for positively locking said clutch members together and movable out of said recess when the centrifugal force falls below a predetermined amount to unlock said members, said bolt being adapted to cooperate with the first named clutch member for preventing the movement of said bolt into said recess until the rotative speeds of said clutch members are substantially synchronous, and spring means associated with said bolt and adapted to oppose movement of the same in either of its positions for building up the forces necessary to move said bolt whereby said bolt when moved will be snapped from one of its positions to the other.

4. In a device of the class described, a rotatable clutch member provided with a bolt-receiving recess, a second rotatable clutch member operatively associated with said first mentioned clutch member and provided with a bolt movable into and out of engagement with said recess to connect and disconnect said clutch members and being movable responsive to changes in said centrifugal force resulting from the rotation of said second mentioned clutch member at different rates, spring-pressed means associated with said bolt and adapted to delay the initial movement of the same in either direction for effecting a difference between the rotative speeds of said second clutch member at which said bolt is movable, said bolt being adapted to cooperate with said first named clutch member for preventing the movement of said bolt into said recess until the rotative speeds of said clutch members are substantially synchronous.

5. In a device of the class described, a rotatable clutch member provided with a bolt-receiving recess, a second rotatable clutch member operatively associated with said first mentioned clutch member and provided with a bolt movable into and out of engagement with said recess to connect and disconnect said clutch members and being movable responsive to changes in centrifugal force resulting from the rotation of said second mentioned clutch member at different rates, spring-pressed means associated with said bolt and adapted to delay the initial movement thereof in either direction for effecting a difference between the rotative speeds of said second clutch member at which said bolt is movable, means for varying the force of said spring-pressed means for varying the difference between the speeds at which said bolt is movable, said bolt being adapted to cooperate with said first named clutch member for preventing the movement of said bolt into said recess until the rotative speeds of said clutch members are substantially synchronous.

6. In a device of the class described, a centrifugally actuated clutch having a pair of rotatable clutch members, a connecting element associated with one of said members and movable in one direction responsive to centrifugal force and upon synchronization of said members to operatively engage the other of said members for interconnecting the same, means operable for moving said element in the other direction when centrifugal force falls below a predetermined amount, and adjustable means opposing only the initial movement of said element responsive to centrifugal force.

7. In a device of the class described, a centrifugally actuated clutch having a pair of rotatable clutch members, a connecting element associated with one of said members and operatively engageable upon synchronization of said members with the other of said members for interconnecting the same, said connecting element being movable in one direction responsive to centrifugal force, means operable for moving said element in the other direction when centrifugal force falls below a predetermined amount, and adjustable means opposing only the initial movement of said element in either direction.

8. In a device of the class described, a centrifugally actuated clutch having a pair of rotatable clutch members, a connecting element associated with one of said members and operatively engageable upon synchronization of said members with the other of said members for interconnecting the same, said connecting element being movable in one direction responsive to centrifugal force, means operable for moving said element in the other direction when centrifugal force falls below a predetermined amount, and adjustable means opposing only the initial movement of said element in one direction.

9. In a device of the class described, the combination of a drum-shaped member having a plurality of slots with a core member having a resiliently held bolt movable outwardly responsive to centrifugal force resulting from rotation of said core member to engage in one of said slots for interconnecting said members and movable inwardly when the centrifugal force falls below a predetermined amount for disconnecting said members, means adapted to oppose movement of said bolt in either of its positions for building up the forces necessary to move said bolt whereby said bolt will when moved be snapped from one of its positions to the other, said bolt being adapted to cooperate with said drum-shaped member for holding said bolt out of said slot until the rotative speeds of said members are substantially synchronous.

10. In a device of the class described, a centrifugally actuated clutch comprising a drum-shaped member provided with a bolt-receiving recess, a rotatable core member nested within said drum-shaped member and provided with a bolt engageable in said recess for connecting said members together, said bolt being movable in one direction responsive to centrifugal force, and spring means operable for moving said bolt in the other direction, and other spring means adapted to oppose the initial movement of said bolt responsive to centrifugal force, said bolt being adapted to cooperate with said drum-shaped member for preventing the engagement of said bolt in said recess until the speeds of said clutch members are substantially synchronous.

11. In a device for drivingly connecting driving and driven members, a pawl carrying structure drivingly connected to one of said members, a pawl receiving structure drivingly connected to the other of said members, said pawl receiving structure having a substantially cylindrical shell formed with a slot extending outwardly therein, a pawl carried by said pawl carrying structure and having a clutching portion thereof adapted for projection into said slot in response to rotation of said structures at substantially the same predetermined speed, yielding means urging said pawl to its retracted position in opposition to centrifugal force acting on said pawl, and latching means for holding said pawl against clutching projection until said structures are rotated at substantially the same predetermined speed as aforesaid.

12. In a clutch, clutching members respectively provided with a pawl and a pawl-receiving slot, said slot being adapted to receive said pawl on rotational synchronization of said members at or above a predetermined speed to positively drivingly connect said members, yielding means opposing the centrifugal force acting on said pawl and urging said pawl to its declutched position, and latch means acting on said pawl, said latch means being released only when said members are synchronized at or above said predetermined speed.

13. In a clutch, a rotatable shell having a slot, means including a centrifugal force actuated pawl rotatable within said shell and adapted for projection into said slot when said pawl and shell are rotated at substantially the same speed at or above a predetermined minimum speed, a detent carried by said rotatable means and including a coil acting on said pawl in opposition to the centrifugal force, and means for adjusting said spring, said adjusting means being accessible through said slot for adjustment thereof, said slot being so arranged as to accommodate outward removal of said spring therethrough.

14. In a centrifugal clutch, a cage provided with a centrifugally actuated pawl, pawl guiding means for said pawl, detent means including an abutment spaced circumferentially of the cage from said guiding means, a spring intermediate said pawl and said abutment, and means for adjusting said abutment to vary the characteristics of said spring.

15. In a centrifugal clutch, a cage provided with a centrifugally actuated pawl, pawl guiding means for said pawl, detent means including an abutment spaced circumferentially of the cage from said guiding means, a spring intermediate said pawl and said abutment, and means for adjusting said abutment to vary the characteristics of said spring, said adjusting means extending outwardly of said cage for manipulation from the exterior thereof.

16. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, a spring engaging said pawl and acting in opposition to said centrifugal force for urging said pawl to its nonclutching position, said spring having an end portion extending from said pawl in a direction generally transverse to the direction of said pawl movement, and means carried by said pawl carrying structure and disposed in circumferentially spaced relation with respect to said pawl for providing an abutment for said spring end portion.

17. In a clutch for drivingly connecting driving and driven coaxial rotatable members, a pawl carrying structure fixed against radial displacement and drivingly connected to one of said members for rotation about the common axis of rotation of said members, a pawl receiving structure drivingly connected to the other of said members for rotation about said axis, said pawl carrying structure having a slideway formed with circumferentially spaced walls extending in a direction outwardly from said axis toward said pawl receiving structure, a pawl carried by said pawl carrying structure and having a clutching portion disposed to one side of said axis for outward sliding movement in said guideway, said pawl clutching portion having at least one side face thereof in sliding engagement with an outwardly extending wall of said slideway, said pawl clutching portion being adapted for clutching movement by centrifugal force exerted thereon in response to rotation of said pawl carrying structure substantially at or above a predetermined critical speed of rotation of said pawl carrying structure, means carried by said pawl receiving structure for receiving said pawl clutching portion to drivingly connect said members when said structures are free from driving connection therebetween and are operated at substantially the same speed of rotation, and yielding means acting on said pawl in opposition to said centrifugal force, at least a portion of said yielding means being disposed at a point spaced circumferentially of said pawl clutching portion outside of the space between the walls of said guideway.

18. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, said pawl and said pawl carrying structure each having a spring engaging portion thereof, said spring engaging portions being circumferentially spaced from each other, and a spring having a portion thereof coiled for engagement with one of said spring engaging portions, said spring having a second portion thereof extending from said coiled portion generally circumferentially for engagement with the other of said spring engaging portions, said spring acting in opposition to said centrifugal force for urging said pawl to its non-clutching position.

19. In a clutch for drivingly connecting driving and driven coaxial rotatable members, a pawl carrying structure fixed against radial displacement and drivingly connected to one of said members for rotation about the common axis of rotation of said members, a pawl receiving structure drivingly connected to the other of said members for rotation about said axis, said pawl carrying structure having a slideway formed with circumferentially spaced walls extending in a direction outwardly from said axis toward said pawl receiving structure, a pawl carried by said pawl carrying structure and having a clutching portion disposed to one side of said axis for outward sliding movement in said slideway, said pawl clutching portion having at least one side face thereof in sliding engagement with an outwardly extending wall of said slideway, said pawl clutching portion being adapted for clutching movement by centrifugal force exerted thereon in response to rotation of said pawl carrying structure substantially at or above a predetermined critical speed of rotation of said pawl carrying structure, means carried by said pawl receiving structure for receiving said pawl clutching portion to drivingly connect said members when said structures are free from driving connection therebetween and are operated at substantially the same speed of rotation, and a detent including a spring rotatably carried with said pawl carrying structure and acting on said pawl in opposition to said centrifugal force, said spring having its end portions disposed at points respectively spaced circumferentially of said pawl clutching portion outside of the space between the walls of said slideway, and spring means for retracting said pawl.

20. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and having an opening adapted to receive said pawl to provide a positive driving connection between said structures, yielding detent means disposed to act on said pawl in opposition to centrifugal force movement thereof, and including adjusting means having an adjusting member carried by said pawl carrying structure, said adjusting member being disposed in circumferentially spaced relation relative to said pawl, said adjusting member being radially registered with said opening during relative rotation of said structures for rendering said adjusting member accessible for actuation exteriorly of said pawl receiving structure, and spring means for retracting said pawl.

21. In a centrifugally operated clutch, in combination, a driving and a driven member, one of said members having a radially extending recess therein, a dog operating in said recess and moved to its projected position under the influence of centrifugal force, said recessed member having a spring-receiving cavity extending generally transversely of said recess, a coiled spring engaging said dog to retract the same, said spring having a portion thereof arranged in said cavity, said spring portion having an end thereof anchored in said cavity.

22. In a centrifugally operated clutch, in combination, a driving and a driven member, one of said members having a recess therein, a dog radially slidable in said recess under the action of centrifugal force, a retracting spring for said dog comprising a coiled spring arranged with the axis of the coils parallel to the axis of said recessed member, said dog having a cavity, said spring having a portion thereof disposed in said cavity and engaging said dog, said spring having an end thereof anchored at least in one direction to said recessed member.

23. The combination with driving and driven members, a positively engaging clutch for establishing driving relation between said members, the members of said clutch being so constructed that they will not engage until the two members of the clutch are operating at substantial synchronism, means for restraining the engagement of said clutch members until the speed of one of said first named members reaches a predetermined point, and means for selectively determining said predetermined point, and spring means for restraining the engagement of said clutch members and for disengaging them when one of said first named members reaches a predetermined speed.

24. The combination with a driving member and a driven member, an automatic clutch for connecting said members, comprising an engaged member and an engaging member, said engaging member including a dog radially movable into engaging position under the influence of centrifugal force, restraining means for said dog constructed to permit the movement of the dog radially outwardly when the speed of the dog-carrying member reaches a predetermined point, and means for selectively determining the predetermined point at which said restraining means will release, and springs for retracting said dog.

25. The combination with a driving member and a driven member, an automatic clutch for effecting a drive connection between said members, comprising an engaged member and an engaging member, said engaging member including a radially movable dog movable radially outward into engaging position under the influence of centrifugal force, a spring for restraining said dog in its disengaged position, and means for selectively varying the tension of said spring, and spring means for retracting said dog.

REX E. KELLER.